US010175968B2

(12) United States Patent
Kania et al.

(10) Patent No.: US 10,175,968 B2
(45) Date of Patent: Jan. 8, 2019

(54) SOFTWARE CATALOG INFORMATION MANAGEMENT

(71) Applicant: International Business Machines Corporation, Armonk, NY (US)

(72) Inventors: Piotr Kania, Cracow (PL); Tomasz Stopa, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 492 days.

(21) Appl. No.: 13/722,999

(22) Filed: Dec. 20, 2012

(65) Prior Publication Data
US 2013/0174138 A1      Jul. 4, 2013

(51) Int. Cl.
*G06F 8/65* (2018.01)

(52) U.S. Cl.
CPC ..................................... *G06F 8/65* (2013.01)

(58) Field of Classification Search
CPC ........................................................ G06F 8/65
See application file for complete search history.

(56) References Cited

U.S. PATENT DOCUMENTS

| 2005/0043942 | A1* | 2/2005 | Trower, II | G06F 3/0237 704/10 |
| 2005/0065811 | A1* | 3/2005 | Chu | G06Q 30/02 705/500 |
| 2007/0150587 | A1* | 6/2007 | D'Alo et al. | 709/224 |
| 2007/0198423 | A1* | 8/2007 | Carbone | G06F 21/10 705/52 |
| 2007/0283308 | A1* | 12/2007 | Basu | G06F 17/5081 716/122 |
| 2008/0077603 | A1* | 3/2008 | Arnott | G06F 21/577 |
| 2008/0250038 | A1* | 10/2008 | Di Litta et al. | 707/100 |
| 2009/0248636 | A1* | 10/2009 | Gangemi et al. | 707/3 |
| 2011/0016287 | A1 | 1/2011 | Acedo et al. | |
| 2012/0173838 | A1 | 2/2012 | Yamamoto et al. | |
| 2012/0030404 | A1 | 7/2012 | Noll et al. | |
| 2014/0053145 | A1* | 2/2014 | Steigleder | 717/169 |

FOREIGN PATENT DOCUMENTS

WO      WO 0205184 A2 * 1/2002

* cited by examiner

*Primary Examiner* — Viva Miller
(74) *Attorney, Agent, or Firm* — Rabindranath Dutta; Konrad, Raynes, Davda and Victor LLP

(57) ABSTRACT

A first computing entity receives a respective set of software discovery rules from each of a plurality of other computing entities. Based on each of the sets of software discovery rules, a set of software discovery rules associated with the first computing entity is modified. The modified set of software discovery rules is communicated to each of the plurality of other computing entities.

18 Claims, 2 Drawing Sheets

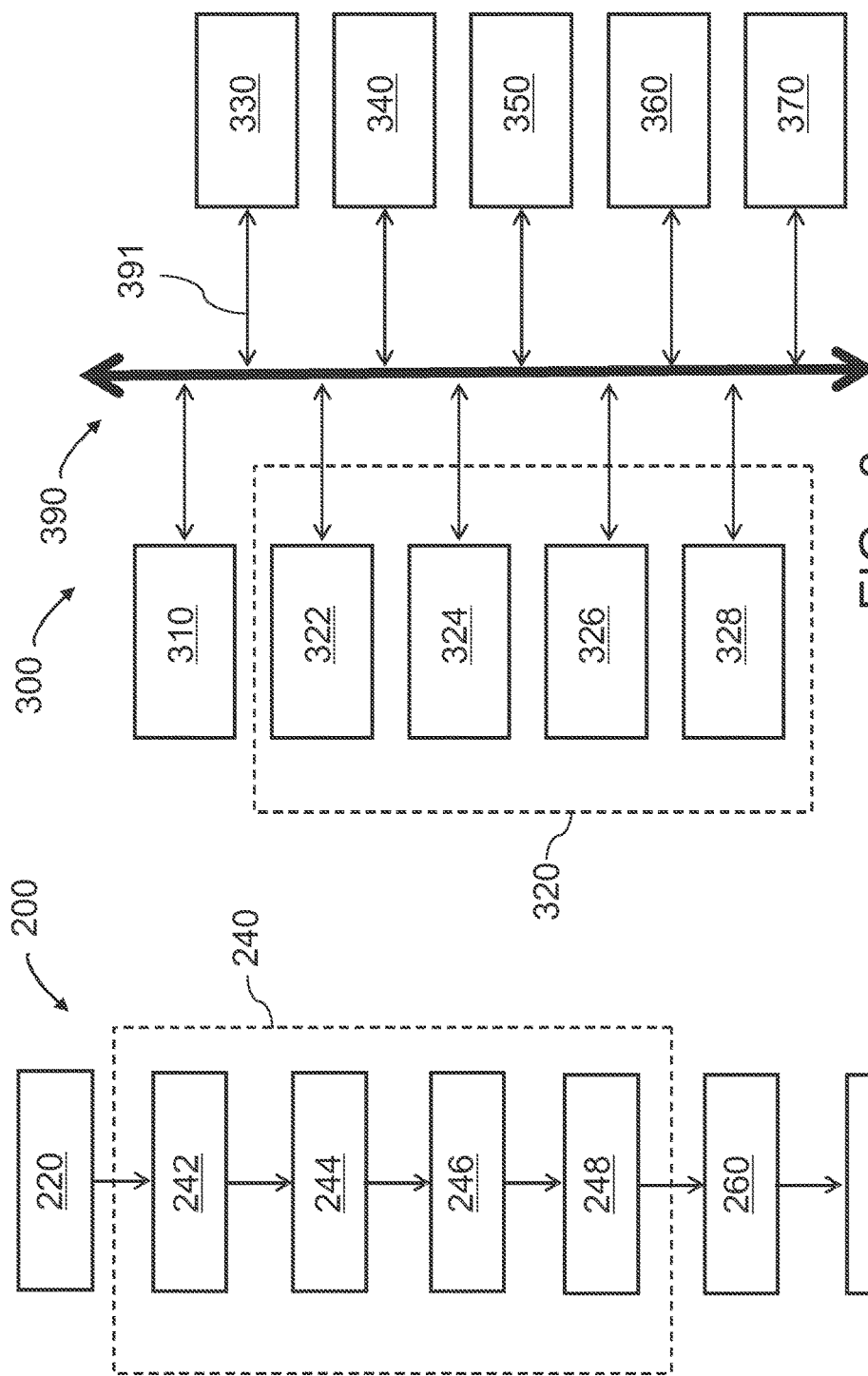

SOFTWARE CATALOG INFORMATION MANAGEMENT

CROSS-REFERENCE TO RELATED FOREIGN APPLICATION

This application is a non-provisional application that claims priority benefits under Title 35, United States Code, Section 119(a)-(d) from EP Patent Application entitled "SOFTWARE CATALOG INFORMATION MANAGEMENT", by Piotr KANIA and Tomasz STOPA having EP Application No. EP12150191.0, filed on Jan. 4, 2012, which EP Application is incorporated herein by reference in its entirety.

BACKGROUND

1. Field

The present invention relates to a method, system, and computer program product for software catalog information management.

2. Background

It is known to maintain a catalog of the software installed on a computing device. Such a catalog may be used for determining when it is appropriate to update software installed on the computing device, for determining license fees that may be incurred by virtue of installation of the software on the computing device, etc. For maintaining the catalog, it is likewise known to employ a set of software discovery rules that stipulate how to assess what software is installed on the computing device.

SUMMARY OF THE PREFERRED EMBODIMENTS

Provided are a method, system, and computer program product in for software catalog information management, in which a first computing entity receives a respective set of software discovery rules from each of a plurality of other computing entities. Based on each of the sets of software discovery rules, a set of software discovery rules associated with the first computing entity is modified. The modified set of software discovery rules is communicated to each of the plurality of other computing entities.

BRIEF DESCRIPTION OF THE DRAWINGS

FIG. 2 shows an exemplary flow diagram of an embodiment of a method of software catalog information management in accordance with the present embodiments; and FIG. 3 schematically shows another embodiment of a software catalog information management system in accordance with the present embodiments.

DETAILED DESCRIPTION

Figure 1:
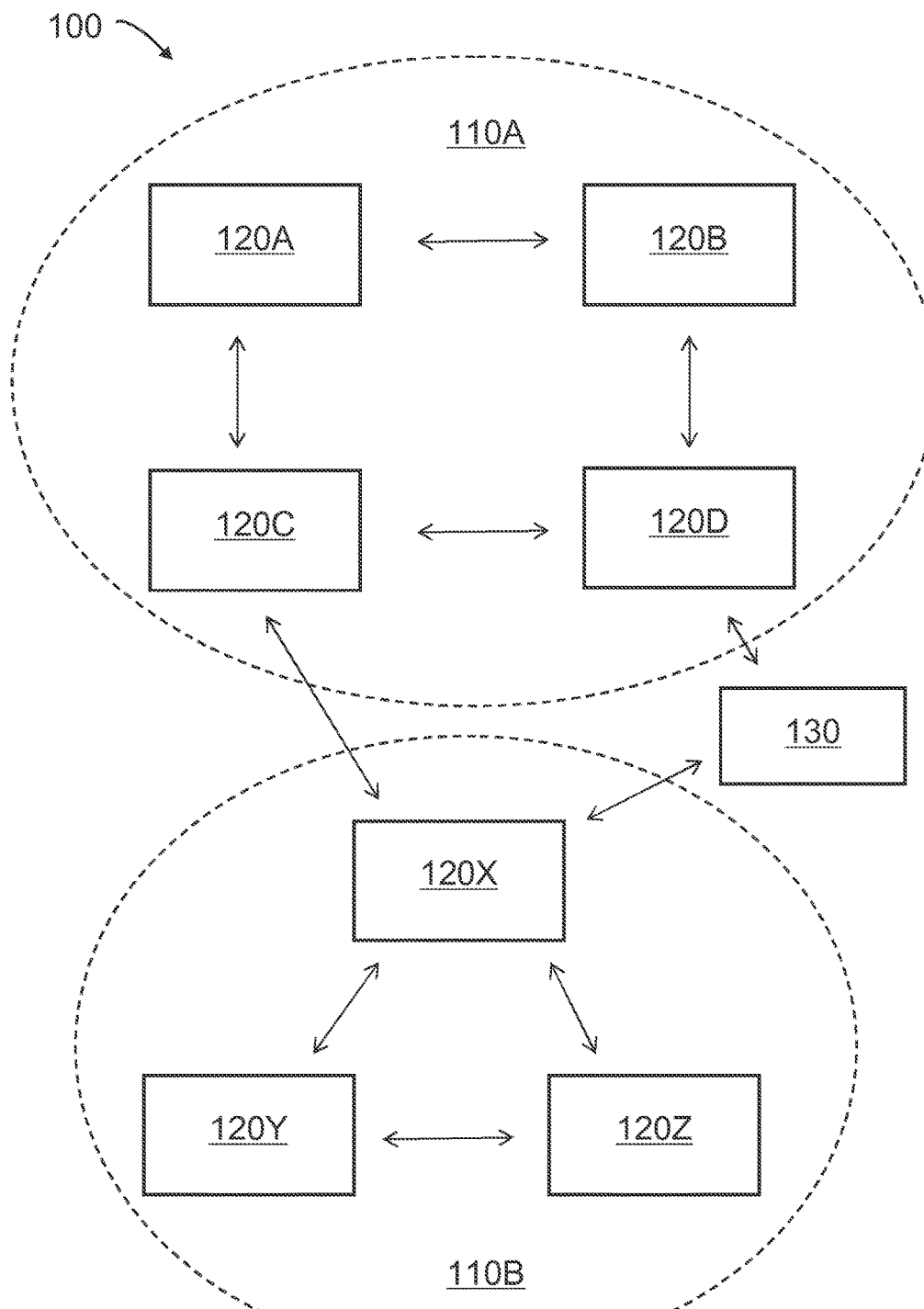
FIG. 1 schematically shows an embodiment of a software catalog information management system in accordance with the present embodiments.

Loosely speaking, the present embodiments teach a method of software catalog information management in which software discovery rules are exchanged between peer computing devices that maintain individual sets of software discovery rules. When new software discovery rules are received from a peer computing device, the differences between a software inventory report generated using the old rules maintained at the receiving device and a software inventory report generated using the new rules is presented to an administrator, who then rates the new rules (e.g. as "good," "neutral" or "bad"). Good rules are added to the list of rules maintained at the receiving device. Other rules are discarded. In this manner, rules are tested in various environments and each computing device "learns" from its peers. The administrator's ratings can be communicated to a server to spread the acquired knowledge over a larger base of computing devices.

Administrators can add new rules as needed, e.g. whenever a discrepancy is noted between the installed software and a software inventory report, for example when seeking to confirm proper installation of a software package. Over time, a rule added to one computing device will, as discussed above, spread to and be tested at other peer machines.

In one aspect, as touched upon supra, the present embodiments relate to a method of software catalog information management.

In the present embodiments, the term "software catalog" may be understood as a collection of data comprising data uniquely identifying one or more software entities. One or more of the software entities may be a software application, i.e. a quantity of code capable of self-contained execution, e.g. that can be executed without requiring code other than that provided by an operating system of a computing entity. One or more of the software entities may moreover be a collection of data, e.g. a database required for proper operation of a software application. The software entities may be uniquely identified by any of a name of the software entity, a part number of the software entity, a path name identifying a path to the respective software entity or to a folder in which the respective software entity is stored, a "signature" of the software entity, etc. Such a "signature" may be a number indicative of or derived/calculated from any of an installation time, a file size, etc. of the software entity. A "software catalog" may include a software inventory report, e.g. data specifying which software entities are installed on a given computing entity/in one or more given realms of a computing entity. Such a software inventory report may specify all software entities installed on the given computing entity/realms or may be limited to software entities of one or more given types, e.g. software entities that are word processing applications, CAD applications or spreadsheet applications and/or that are databases required by such applications (e.g. a dictionary database or a database of basic CAD data (e.g. data representative of standard screws and bolts)).

The method may comprise receiving a set of software discovery rules, e.g. via a computer network.

In the present embodiments, any "receiving" may be accompanied by a "storing" of the received element/information, e.g. in a computer memory, on a hard disk, in a flash storage device or in any other storage device. In other words, where the method comprises a receiving of an element/information, the method may comprise a storing of the received element/information.

In the present embodiments, the expression "software discovery rules" may be understood as a set of criteria and/or instructions for establishing a software inventory report, e.g. for assessing which software entities are installed on a computer system or in one or more given realms of a computer system. For example, software discovery rules may specify how to assess which software entities are installed on a given computing entity/in one or more given realms of a computing entity. Such realms may be folders, volumes, etc. of the computing entity. The aforementioned instructions may be instructions executable on a computing entity and may be written in any programming language, command language, scripting language or mixture thereof, e.g. in UNIX, Perl, JavaScript, C, etc.

The method may comprise receiving a (respective) set of software discovery rules at a computing entity (hereinafter "first computing entity," whereby the term "first" is not meant in an ordinal sense, but instead simply distinguishes one computing entity from "other" computing entities) from (each of) a plurality of other computing entities. Such a receiving may be carried out at regular intervals, e.g. once a month, or in response to a corresponding user input. In other words, each of the aforementioned computing entities (i.e. the plurality of other computing entities as well as the first computing entity) may comprise a respective set of software discovery rules, e.g. software discovery rules that were established by an administrator of the respective computing entity. In other words, a respective set of software discovery rules may be maintained at each of the computing entities. Accordingly, the method may comprise establishing/maintaining a respective set of software discovery rules at one or more or all of the aforementioned computing entities. The set of software discovery rules at any one of the aforementioned computing entities may differ from the set of software discovery rules at any other of the aforementioned computing entities.

For the sake of legibility, the present embodiments refer to a set of software discovery rules comprised by a computing entity as a "set of software discovery rules associated with the computing entity."

In the present embodiments, the term "administrator" may be understood as a person who is knowledgeable of what software entities are installed on the respective computing entity and/or a person who has rights to install executable software entities on the respective computing entity.

One or more of the computing entities may, for example, be a laptop computer, a personal computer or other single end-user computing device or a computing environment configured to be accessible only to a single user, e.g. a user account on a personal computer or a user account in a computer network, and may be understood as including one or more storage devices attached directly to such a laptop computer, personal computer, etc.

One or more of the computing entities may be peers, e.g. computing entities that execute vastly identical tasks and/or that are equipped with vastly identical software. Similarly, one or more of the computing entities may be peers in the sense that they belong to a common network, i.e. share a common IP address as seen from the public Internet or belong to a common subnet of IP addresses. Similarly, one or more of the computing entities may be peers in the sense that they are property of a single business unit (of a single legal entity). Moreover, one or more of the computing entities may be peers in the sense that they are elements of a single computing environment, e.g. elements of a computing environment operated by a single legal entity, e.g. a corporation, institute, government agency, etc. Such a computing environment may include a plurality of networked computers, servers, etc. The computing environment may be accessible solely to employees/members of the legal entity. The computing environment may furthermore be accessible to third parties, i.e. to persons that are not employees/members of the legal entity. The legal entity, as the operator of the computing environment, may bear the legal responsibility for purchase/licensing of some or all software employed within the computing environment. The boundary of the computing environment may be defined by one or more boundaries where legal responsibility for purchase/licensing of some or all software employed within the computing environment would shift to another legal entity. The boundary of the computing environment may be the property boundaries of the legal entity's place(s) of business. The property boundaries may be understood as encompassing mobile devices used by employees/members of the legal entity at a location remote from the legal entity's premises. In the case of outsourced services, for example, a contract between the legal entity and a service provider may stipulate that legal responsibility for purchase/licensing of some or all software employed within the computing environment may be incumbent upon the legal entity, although part or all of the computing environment is operated by one or more service providers not necessarily affiliated with the legal entity.

The method may comprise modifying the set of software discovery rules associated with the first computing entity, e.g. based on each of the received sets of software discovery rules. For example, the modifying may comprise a single modifying action based on each of the software discovery rules of all of the received sets of software discovery rules, a single modifying action based on one or more software discovery rules of each of the received sets of software discovery rules or an iterative modifying process, each iteration being based on one or more software discovery rules of one or more of the received sets of software discovery rules.

The modifying may comprise adding one or more software discovery rules of one or more of the received sets of software discovery rules to the set of software discovery rules associated with the first computing entity. Similarly, the modifying may comprise deleting one or more software discovery rules from the set of software discovery rules associated with the first computing entity. Likewise, the modifying may comprise altering one or more software discovery rules of the set of software discovery rules associated with the first computing entity.

The method may comprise communicating the modified set of software discovery rules (associated with the first computing entity) to one or more or each of the plurality of other computing entities, e.g. via a computer network.

The method may comprise generating one or more (first) software inventory reports based on one or more or all of the software discovery rules of the set of discovery rules associated with the first computing entity.

The method may comprise generating one or more (second) software inventory reports based on one or more or all of the software discovery rules of one or more or all of the received sets of software discovery rules.

In either or both of the aforementioned cases, the generating may comprise, for each respective one of the software rules on which the report is based, establishing which software entities installed on the first computing entity fulfill the respective rule and/or executing a set of instructions defined by the respective rule. The software inventory reports may specify which software entities were revealed by which rule, i.e. may specify which rule resulted in a software entity listed in the report being established as being installed on the first computing entity. In either or both of the aforementioned cases, the generating of one or more software inventory reports may constitute an element of the aforementioned modifying of the set of software discovery rules associated with the first computing entity.

The method may comprise determining a difference (also called a "delta") between one or more or all of the aforementioned first software inventory reports and one or more or all of the aforementioned second software inventory reports. The method may moreover comprise communicating the difference to a user, e.g. by generating a delta report, i.e. a software inventory report indicative solely of the determined difference. The delta report may likewise specify which software entities were revealed by which rule. The determining of a difference may constitute an element of the aforementioned modifying of the set of software discovery rules associated with the first computing entity.

The method may comprise receiving a user input indicative of whether to add one or more or all of the software discovery rules of one or more or all of the received sets of software discovery rules to the set of discovery rules associated with the first computing entity. Similarly, the method may comprise receiving a user input indicative of whether to delete/alter one or more or all of the software discovery rules of the set of discovery rules associated with the first computing entity. User input indicative of a desire to alter software discovery rules may specify how to modify the respective rules. The user input may be received in response to the delta report. The receiving of user input may constitute an element of the aforementioned modifying of the set of software discovery rules associated with the first computing entity.

The method may comprise (again optionally as an element of the aforementioned modifying of the set of software discovery rules associated with the first computing entity) modifying the set of software discovery rules associated with the first computing entity based on/in accordance with the user input. In other words, the method may comprise adding/deleting/altering software discovery rules to/from/of the set of software discovery rules associated with the first computing entity based on/in accordance with the user input.

Loosely summarizing the preceding paragraphs, the first-mentioned modifying the set of software discovery rules associated with the first computing entity may comprise generating a first inventory report (based on software discovery rules currently associated with the first computing entity) and a second inventory report (based on software discovery rules received from and associated with other computing entity), generating a delta report indicative of differences between the first and second inventory report (perhaps with reference to the underlying rules), receiving a user input in response to the delta report (the user input being indicative of desired changes to the set of software discovery rules associated with the first computing entity) and modifying the set of software discovery rules associated with the first computing entity accordingly.

The method may comprise communicating the aforementioned user input to a server together with an indication of the software discovery rule(s) to which the user input pertains. In this respect, each software discovery rule may be assigned a unique identification code. A modifying of a software discovery rule may require that the software discovery rule be assigned a new unique identification code. The method may comprise such assigning of a (new) unique identification code to a software discover rule. The method may comprise receiving the aforementioned user input at the server together with the indication of the software discovery rule(s) to which the user input pertains.

In the context of the present embodiments, the term "server" may be understood as a computing entity that performs tasks for and/or that supplies data to one or more other computing entities.

The method may comprise receiving the modified set of software discovery rules (associated with the first computing entity) at one or more or each of the plurality of other computing entities, e.g. via a computer network. As above, such a receiving may be carried out at regular intervals, e.g. once a month, or in response to a corresponding user input.

The method may comprise modifying, at one or more or each of the plurality of other computing entities (that received the modified set of software discovery rules (associated with the first computing entity)), the set of software discovery rules associated with the respective computing entity based on the received modified set of software discovery rules (associated with the first computing entity). The modifying of the set of software discovery rules associated with the respective other computing entity based on the received modified set of software discovery rules may be effected in a manner analogous to the aforementioned modifying of the set of software discovery rules associated with the first computing entity based on software discovery rules received from other computing entities. The above description thus applies mutatis mutandis.

For example, the method/the modifying of the set of software discovery rules associated with the respective other computing entity may comprise generating one or more (third) software inventory reports based on one or more or all of the software discovery rules of the set of discovery rules associated with the respective other computing entity.

The method/the modifying of the set of software discovery rules associated with the respective other computing entity may comprise generating one or more (fourth) software inventory reports based on one or more or all of the software discovery rules of the received modified set of software discovery rules associated with the first computing entity.

The method/the modifying of the set of software discovery rules associated with the respective other computing entity may comprise determining a difference between one or more or all of the aforementioned third software inventory reports and one or more or all of the aforementioned fourth software inventory reports. The method/the modifying of the set of software discovery rules associated with the respective other computing entity may moreover comprise communicating the difference to a user, e.g. by generating a delta report.

The method/the modifying of the set of software discovery rules associated with the respective other computing entity may comprise receiving a (respective) user input indicative of whether to add one or more or all of the software discovery rules of the received modified set of software discovery rules (associated with the first computing entity) to the set of discovery rules associated with the respective other computing entity. Similarly, the method/the modifying of the set of software discovery rules associated with the respective other computing entity may comprise receiving a (respective) user input indicative of whether to delete/alter one or more or all of the software discovery rules of the set of discovery rules associated with the respective other computing entity. The user input may be a rating of the respective software discovery rules (e.g. as "good," "neutral" or "bad"). For example, software discovery rules rated "good" may be added and software discovery rules rated "bad" or "neutral" may be deleted.

The method/the modifying of the set of software discovery rules associated with the respective other computing entity may comprise (again optionally as an element of the aforementioned modifying of the set of software discovery rules associated with the respective other computing entity) modifying the set of software discovery rules associated with the respective other computing entity based on/in accordance with the (respective) user input.

The method may comprise communicating the aforementioned (respective) user input to a server together with an indication of the software discovery rule(s) to which the user input pertains, e.g. together with the corresponding unique identification code(s). The method may comprise receiving the aforementioned (respective) user input at the server together with the indication of the software discovery rule(s) to which the user input pertains.

Loosely summarizing the preceding paragraphs, the first-mentioned modifying the set of software discovery rules associated with the respective other computing entity may comprise generating a third inventory report (based on software discovery rules currently associated with the respective other computing entity) and a fourth inventory report (based on modified software discovery rules received from and associated with the first computing entity), generating a delta report indicative of differences between the third and fourth inventory report (perhaps with reference to the underlying rules), receiving a user input in response to the delta report (the user input being indicative of desired changes to the set of software discovery rules associated with the respective other computing entity) and modifying the set of software discovery rules associated with the respective other computing entity accordingly.

In other words, just as the software discovery rules associated with the first computing entity may be modified based on software discovery rules associated with other computing entities, the software discovery rules respectively associated with other computing entities may be modified based on the modified software discovery rules associated with first computing entity.

The method may comprise scoring each of a plurality of software discovery rules based on the user input and/or one or more or all of the (respective) user inputs communicated to the server. For example, one or more or each of the software discovery rules to which the user input/the (respective) user inputs respectively pertain may be scored based on the corresponding user input/(respective) user input.

The method may comprise communicating one or more or each of the plurality of software discovery rules having a score that exceeds a given threshold (e.g. a user-defined threshold) to another plurality of computing entities, i.e. to a plurality of computing entities distinct from the first computing entity and the aforementioned "other" computing entities. In other words, of the plurality of software discovery rules that have been scored, the communicating may be limited to one or more or each of those software discovery rules that have achieved a "sufficient" score. For example, a software discovery rule may be considered to have a sufficient score if a given total number of "good" ratings have been communicated to the server for that software discovery rule or if the percentage of "good" ratings relative to the total number of ratings communicated to the server for that software discovery rule exceeds a given percentage.

The method may comprise receiving a user input representative of a new software discovery rule. Furthermore, the method may comprise adding the new software discovery rule represented by the user input to the set of software discovery rules associated with the computing entity. Similarly, the method may comprise receiving a user input representative of a desired modification of an existing software discovery rule. The method may comprise modifying an existing software discovery rule of the set of software discovery rules associated with the computing entity in accordance with the user input. For example, an administrator reviewing the installation of a software package may note that a software inventory report generated using the software discovery rules associated with the computing entity where the software package was installed does not list the newly installed software package and may thus choose, e.g. using a graphic user interface, to add and/or modify one or more software discovery rules to the set of software discovery rules associated with the computing entity. As touched upon above, the method may comprise assigning a unique identification code to the newly added/modified software discovery rule. The method may comprise communicating the unique identification code to the aforementioned server, e.g. together with a rating of the newly added/modified software discovery rule as "good."

The set of software discovery rules associated with a respective computing entity may an element of a software catalog for the respective computing entity. In other words, a software catalog for a respective computing entity may comprise a set of software discovery rules associated with the respective computing entity. As touched upon above, a software catalog for a respective computing entity may also comprise a software inventory report for the respective computing entity.

While the teachings of the present embodiments have been discussed hereinabove mainly in the form of a method, the teachings may be embodied, mutatis mutandis, in the form of a system, e.g. a software catalog information management system, or a computer program product, as will be appreciated by the person skilled in the art.

The system may be configured and adapted to effect any of the actions described above with respect to the disclosed method. For example, the system may comprise a control component that effects any of the actions described above with respect to the disclosed method.

The system may comprise a discovery rule receiving component that receives a respective set of software discovery rules as discussed hereinabove.

The system may comprise a rule modifying component that modifies a set of software discovery rules as discussed hereinabove.

The system may comprise a modified rule communicating component that communicates a modified set of software discovery rules as discussed hereinabove.

The system may comprise a software inventory report generating component that generates a software inventory report as discussed hereinabove.

The system may comprise a difference determining component that determines a difference between software inventory reports as discussed hereinabove.

The system may comprise a user input receiving component that receives user inputs from a user as discussed hereinabove.

The system may comprise a software discovery rule modifying component that modifies a set of software discovery rules as discussed hereinabove.

The system may comprise a user input communicating component that communicates a user input as discussed hereinabove.

The system may comprise a communicated user input receiving component that receives user inputs communicated together with the indication of the software discovery rule(s) to which the user input pertains from a computing entity as discussed hereinabove.

The system may comprise a rule scoring component that scores one or more software discovery rules as discussed hereinabove.

The system may comprise a rule communicating component that communicates one or more software discovery rules as discussed hereinabove.

Any of the aforementioned components of the system may communicate with any other of the aforementioned components of the system. In this respect, the system may comprise one or more communication busses and/or network links interconnecting the respective components.

FIG. 1 schematically shows an embodiment of a software catalog information management system 100 in accordance with the present embodiments, e.g. as described above.

In the illustrated embodiment, software catalog information management system 100 comprises a plurality of computing entities 120 and a server 130 that, as indicated by arrows, are communicatively networked. Software catalog information management system 100 is shown as comprising two subnets 110A and 110B. For example, subnet 110A may be located at one physical location, e.g. in Prague, and subnet 110B may be located at a different physical location, e.g. in Bangkok. Server 130 may be located at yet another physical location, e.g. in Stuttgart. Subnets 110A and 110B may belong to a single business unit, e.g. encompass the computers of a hardware design team working together on designing a new DRAM cell technology within a company. Subnet 110A is shown as comprising four computing entities 120A-120D and subnet 110B is shown as comprising three computing entities 120X-120Z, e.g. laptop or desktop computers. Each of computing entities 120A-120D and 120X-120Z may comprise a respective software catalog comprising a respective set of software discovery rules and a respective software inventory report listing the software installed on the respective computing entity.

FIG. 2 shows an exemplary flow diagram 200 of an embodiment of a method of software catalog information management in accordance with the present embodiments, e.g. as described above.

In the illustrated embodiment, flow diagram 200 comprises a step 220 where a set of software discovery rules is received at a computing entity, a step 240 where the set of software discovery rules is modified, a step 260 where the modified set of software discovery rules is communicated to another computing entity and a step 280 where a user input is communicated.

Step 240 is moreover shown as comprising a step 242 where a software inventory report is generated, a step 244 where a difference is determined between the generated software inventory report and another software inventory report, a step 246 where a user input is received and a step 248 where the set of software discovery rules is modified based on the user input.

Any of the steps shown in FIG. 2 may be effected as described above. For example, step 220 may comprise receiving a respective set of software discovery rules at a computing entity from each of a plurality of other computing entities, e.g. at computing entity 120A from computing entities 120B-120D and 120X-120Z. The user input communicated in step 280 may be the user input received at step 246 and may be communicated to server 130.

FIG. 3 schematically shows another embodiment of a software catalog information management system 300 in accordance with the present embodiments, e.g. as described above.

In the illustrated embodiment, software catalog information management system 300 comprises a discovery rule receiving component 310, a rule modifying component 320, a modified rule communicating component 330, a user input communicating component 340, a communicated user input receiving component 350, a rule scoring component 360 and a rule communicating component 370 and as well as a communication network 390 comprising a plurality of communication links 391 (for the sake of legibility, only one of the communication links bears a reference sign). One or more of communication links 391 may be implemented using communication means within a computing entity, e.g. a communication bus, or even within a processor of a computing entity, e.g. a bus that interconnects registers and/or a cache of the processor. Communication network 390 communicatively interconnects the aforementioned components 310-370. As touched upon above, the system may moreover comprise a control component (not shown).

In the illustrated embodiment, rule modifying component 320 comprises a software inventory report generating component 322, a difference determining component 324, a user input receiving component 326 and a software discovery rule modifying component 348. In an alternative embodiment, the system may comprise a user input receiving component that is not an element of rule modifying component 320.

Discovery rule receiving component 310, rule modifying component 320, modified rule communicating component 330 and user input communicating component 340 may be elements of a computing entity, e.g. of any one of computing entities 120A-120D and 120X-120Z. As such, the system may comprise a plurality of such components. In other words, one or more or each of computing entities 120A-120D and 120X-120Z may respectively comprise such components.

Communicated user input receiving component 350, rule scoring component 360 and rule communicating component 370 may be elements of server 130. In other words, server 130 may comprise communicated user input receiving component 350, rule scoring component 360 and rule communicating component 370.

As will be appreciated by one skilled in the art, aspects of the present embodiments may be embodied as a system, method or computer program product. Accordingly, aspects of the present embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In the present embodiments, the verb "may" is used to designate optionality/noncompulsoriness. In other words, something that "may" can, but need not.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of software catalog information management, the method comprising:

maintaining a plurality of computing entities comprising computational devices in at least two subnets located at least two different physical locations, wherein the plurality of computing entities are in communication with a server via the two subnets;

receiving, at a first computing entity, a respective set of software discovery rules from each of a plurality of other computing entities, wherein software discovery rules comprise instructions for establishing software inventory reports for installed software entities, and wherein each software discovery rule has an unique identification code;

modifying, based on each of the sets of software discovery rules, a set of software discovery rules associated with the first computing entity to generate a modified set of software discovery rules by: generating a software inventory report based on at least one software discovery rule belonging to at least one of the received sets of software discovery rules; determining a difference between the generated software inventory report and a software inventory report generated based on the set of software discovery rules associated with the first computing entity; receiving a user input indicative of whether to add the at least one software discovery rule to the set of software discovery rules associated with the first computing entity; scoring comprising rating into one of at least three categories comprising a first category of ratings, a second category of ratings, and a third category of ratings of each of a plurality of software discovery rules by user inputs, wherein a software discovery rule has a sufficient score for exceeding a given threshold if a percentage of the first category of ratings relative to a total number of ratings for the software discovery rule exceeds a given percentage, wherein a difference between a first software inventory report and a second software inventory report is communicated to a user for rating, by generating a delta report that specifies which software entities were revealed by which software discovery rule; and iteratively modifying the set of software discovery rules associated with the first computing entity based on the user input;

communicating each of the modified set of software discovery rules to each of another plurality of computing entities;

assigning a new unique identification to a modified software discovery rule;

communicating the new unique identification code to the server along with a rating of the modified software discovery rule;

in response to the rating by the user, adding selected software discovery rules to a list of software discovery rules maintained at a receiving computing entity;

distributing the rating of the user to the server to spread information on software discovery rules to other computing entities;

generating, at the respective other computing entity, a respective software inventory report based on at least one software discovery rule belonging to the modified set of software discovery rules; and determining a difference between the respective generated software inventory report and a software inventory report generated based on the respective set of software discovery rules associated with the respective other computing entity, wherein based on the determined difference a selected set of software discovery rules are added to a list of software discovery rules and other sets of software discovery rules are not added to the list of software discovery rules.

2. The method of claim 1, the method comprising:
receiving, at each of the other computing entities, the modified set of software discovery rules; and
modifying, at each of the other computing entities, the respective set of software discovery rules based on the modified set of software discovery rules.

3. The method of claim 2, wherein the modifying at the respective other computing entity comprises:
receiving a respective user input indicative of whether to add the at least one software discovery rule belonging to the modified set of software discovery rules to the respective set of software discovery rules associated with the respective other computing entity; and
modifying the respective set of software discovery rules associated with the respective other computing entity based on the respective user input.

4. The method of claim 1, wherein:
each of the first computing entity and the plurality of other computing entities is a single end-user computing device.

5. A system for software catalog information management, the system comprising:
a memory; and
a processor coupled to the memory, wherein the processor performs operations, the operations comprising:
maintaining a plurality of computing entities comprising computational devices in at least two subnets located at least two different physical locations, wherein the plurality of computing entities are in communication with a server via the two subnets;
receiving, at a first computing entity, a respective set of software discovery rules from each of a plurality of other computing entities, wherein software discovery rules comprise instructions for establishing software inventory reports for installed software entities, and wherein each software discovery rule has an unique identification code;
modifying, based on each of the sets of software discovery rules, a set of software discovery rules associated with the first computing entity to generate a modified set of software discovery rules by: generating a software inventory report based on at least one software discovery rule belonging to at least one of the received sets of software discovery rules; determining a difference between the generated software inventory report and a software inventory report generated based on the set of software discovery rules associated with the first computing entity; receiving a user input indicative of whether to add the at least one software discovery rule to the set of software discovery rules associated with the first computing entity; scoring comprising rating into one of at least three categories comprising a first category of ratings, a second category of ratings, and a third category of ratings of each of a plurality of software discovery rules by user inputs, wherein a software discovery rule has a sufficient score for exceeding a given threshold if a percentage of the first category of ratings relative to a total number of ratings for the software discovery rule exceeds a given percentage, wherein a difference between a first software inventory report and a second software inventory report is communicated to a user for rating, by generating a delta report that specifies which software entities were revealed by which software discovery rule; and iteratively modifying the set of software discovery rules associated with the first computing entity based on the user input;
communicating each of the modified set of software discovery rules to each of another plurality of computing entities, wherein a new unique identification code is assigned to a modified software discovery rule;
assigning a new unique identification to a modified software discovery rule;
communicating the new unique identification code to the server along with a rating of the modified software discovery rule;
in response to the rating by the user, adding selected software discovery rules to a list of software discovery rules maintained at a receiving computing entity;
distributing the rating of the user to the server to spread information on software discovery rules to other computing entities;

generating, at the respective other computing entity, a respective software inventory report based on at least one software discovery rule belonging to the modified set of software discovery rules; and determining a difference between the respective generated software inventory report and a software inventory report generated based on the respective set of software discovery rules associated with the respective other computing entity, wherein based on the determined difference a selected set of software discovery rules are added to a list of software discovery rules and other sets of software discovery rules are not added to the list of software discovery rules.

6. The system of claim 5, the operations comprising:

receiving, at each of the other computing entities, the modified set of software discovery rules; and modifying, at each of the other computing entities, the respective set of softwr discovery rules based on the modified set of software discovery rules.

7. The system of claim 6, wherein the modifying at the respective other computing entity comprises:

receiving a respective user input indicative of whether to add the at least one software discovery rule belonging to the modified set of software discovery rules to the respective set of software discovery rules associated with the respective other computing entity; and modifying the respective set of software discovery rules associated with the respective other computing entity based on the respective user input.

8. The system of claim 5, wherein:

each of the first computing entity and the plurality of other computing entities is a single end-user computing device.

9. A computer program product, the computer program product comprising a non-transitory computer readable storage medium having computer readable program code embodied therewith, the computer readable program code configured to perform operations, the operations comprising:

maintaining a plurality of computing entities comprising computational devices in at least two subnets located at least two different physical locations, wherein the plurality of computing entities are in communication with a server via the two subnets;

receiving, at a first computing entity, a respective set of software discovery rules from each of a plurality of other computing entities, wherein software discovery rules comprise instructions for establishing software inventory reports for installed software entities, and wherein each software discovery rule has an unique identification code;

modifying, based on each of the sets of software discovery rules, a set of software discovery rules associated with the first computing entity to generate a modified set of software discovery rules by: generating a software inventory report based on at least one software discovery rule belonging to at least one of the received sets of software discovery rules; determining a difference between the generated software inventory report and a software inventory report generated based on the set of software discovery rules associated with the first computing entity; receiving a user input indicative of whether to add the at least one software discovery rule to the set of software discovery rules associated with the first computing entity; scoring comprising rating into one of at least three categories comprising a first category of ratings, a second category of ratings, and a third category of ratings of each of a plurality of software discovery rules by user inputs, wherein a software discovery rule has a sufficient score for exceeding a given threshold if a percentage of the first category of ratings relative to a total number of ratings for the software discovery rule exceeds a given percentage, wherein a difference between a first software inventory report and a second software inventory report is communicated to a user for rating, by generating a delta report that specifies which software entities were revealed by which software discovery rule; and iteratively modifying the set of software discovery rules associated with the first computing entity based on the user input;

communicating each of the modified set of software discovery rules to each of another plurality of computing entities, wherein a new unique identification code is assigned to a modified software discovery rule;

assigning a new unique identification to a modified software discovery rule;

communicating the new unique identification code to the server along with a rating of the modified software discovery rule;

in response to the rating by the user, adding selected software discovery rules to a list of software discovery rules maintained at a receiving computing entity;

distributing the rating of the user to the server to spread information on software discovery rules to other computing entities;

generating, at the respective other computing entity, a respective software inventory report based on at least one software discovery rule belonging to the modified set of software discovery rules; and determining a difference between the respective generated software inventory report and a software inventory report generated based on the respective set of software discovery rules associated with the respective other computing entity, wherein based on the determined difference a selected set of software discovery rules are added to a list of software discovery rules and other sets of software discovery rules are not added to the list of software discovery rules.

10. The computer program product of claim 9, the operations comprising:

receiving, at each of the other computing entities, the modified set of software discovery rules; and modifying, at each of the other computing entities, the respective set of software discovery rules based on the modified set of software discovery rules.

11. The computer program product of claim 7, wherein the modifying at the respective other computing entity comprises:

receiving a respective user input indicative of whether to add the at least one software discovery rule belonging to the modified set of software discovery rules to the respective set of software discovery rules associated with the respective other computing entity; and modifying the respective set of software discovery rules associated with t respective other computing entity based on the respective user input.

12. The computer program product of claim 9, wherein:

each of the first computing entity and the plurality of other computing entities is a single end-user computing device.

13. The method of claim 1, wherein the software discovery rule has a sufficient score for exceeding the given threshold if a given total number of the first category of ratings for the software discovery rule have been communicated to the server.

14. The system of claim 5, wherein the software discovery rule has a sufficient score for exceeding the given threshold if a given total number of the first category of ratings for the software discovery rule have been communicated to the server.

15. The computer program product of claim 9, wherein the software discovery rule has a sufficient score for exceeding the given threshold if a given total number of the first category of ratings for the software discovery rule have been communicated to the server.

16. The method of claim 1, wherein:
- a software entity is identified by a number determined from an installation time of the software entity;
- software discovery rules in the set of software discovery rules are received at regular intervals of time;
- different computing entities have different software discovery rules; and
- in response to determining the difference between the respective generated software inventory report and a software inventory report generated based on the respective set of software discovery rules associated with the respective other computing entity, receiving a user input that is indicative of desired changes to software discovery rules.

17. The system of claim 5, wherein:
- a software entity is identified by a number determined from an installation time software entity;
- software discovery rules in the set of software discovery rules are received at regular intervals of time;
- different computing entities have, different software discovery rules; and
- in response to determining the difference between the respective generated software inventory report and a software inventory report generated based on the respective set of software discovery rules associated with the respective other computing entity, receiving a user input that is indicative of desired changes to software discovery rules.

18. The computer program product of claim 9, wherein:
- a software entity is identified by a number determined from an installation time of the software entity;
- software discovery rules in the set of software discovery rules are received at regular intervals of time;
- different computing entities have different software discovery rules; and
- in response to determining the difference between the respective generated software inventory report and a software inventory report generated based on the respective set of software discovery rules associated with the respective other computing entity, receiving a user input that is indicative of desired changes to software discovery rules.

* * * * *